United States Patent [19]

Snyder et al.

[11] 4,062,297
[45] Dec. 13, 1977

[54] FREIGHT CAR LADING TIE DOWN ANCHOR

[75] Inventors: Richard C. Snyder, Michigan City, Ind.; Harold A. Wold, New Buffalo, Mich.

[73] Assignee: Pullman Incorporated, Chicago, Ill.

[21] Appl. No.: 658,784

[22] Filed: Feb. 17, 1976

[51] Int. Cl.² .......................... B60P 7/08; B60P 7/16; B61D 17/04; B61D 45/00
[52] U.S. Cl. .................................. 105/480; 105/409; 105/481
[58] Field of Search ............... 105/409, 476, 478, 479, 105/480, 481

[56] References Cited

U.S. PATENT DOCUMENTS

| | | | |
|---|---|---|---|
| 2,601,103 | 6/1952 | Dietrichson | 105/481 |
| 2,759,432 | 8/1956 | Adler | 105/479 |
| 3,089,436 | 5/1963 | Buckley | 105/481 |
| 3,125,966 | 3/1964 | Johnson | 105/479 |
| 3,161,152 | 12/1964 | Johansson et al. | 105/409 |
| 3,179,068 | 4/1965 | Jensen | 105/479 |
| 3,202,112 | 8/1965 | Oakley | 105/479 |
| 3,251,315 | 5/1966 | Liebig | 105/481 |
| 3,585,942 | 6/1971 | Shaver | 105/409 |
| 3,704,672 | 12/1972 | Santho | 105/480 |
| 3,769,917 | 11/1973 | Snyder et al. | 105/479 |
| 3,788,240 | 1/1974 | Nadherny | 105/476 |
| 3,842,756 | 10/1974 | Marulic | 105/480 |

Primary Examiner—Robert J. Spar
Assistant Examiner—Howard Beltran
Attorney, Agent, or Firm—Thomas G. Anderson

[57] ABSTRACT

A lading tie down anchor construction for a railway box car having an outside wall post includes an anchor plate which is attached to the longitudinal flanges of the post to provide a surface flush with the inner vertical wall surface of the car. The anchor plate includes vertically spaced attaching surfaces and alternate depressed pockets therebetween. A flat anchoring bar is connected to the attaching surfaces and extends over the pockets which are provided with vertically extending side portions through which a lading strap may be connected to the anchoring post.

4 Claims, 6 Drawing Figures

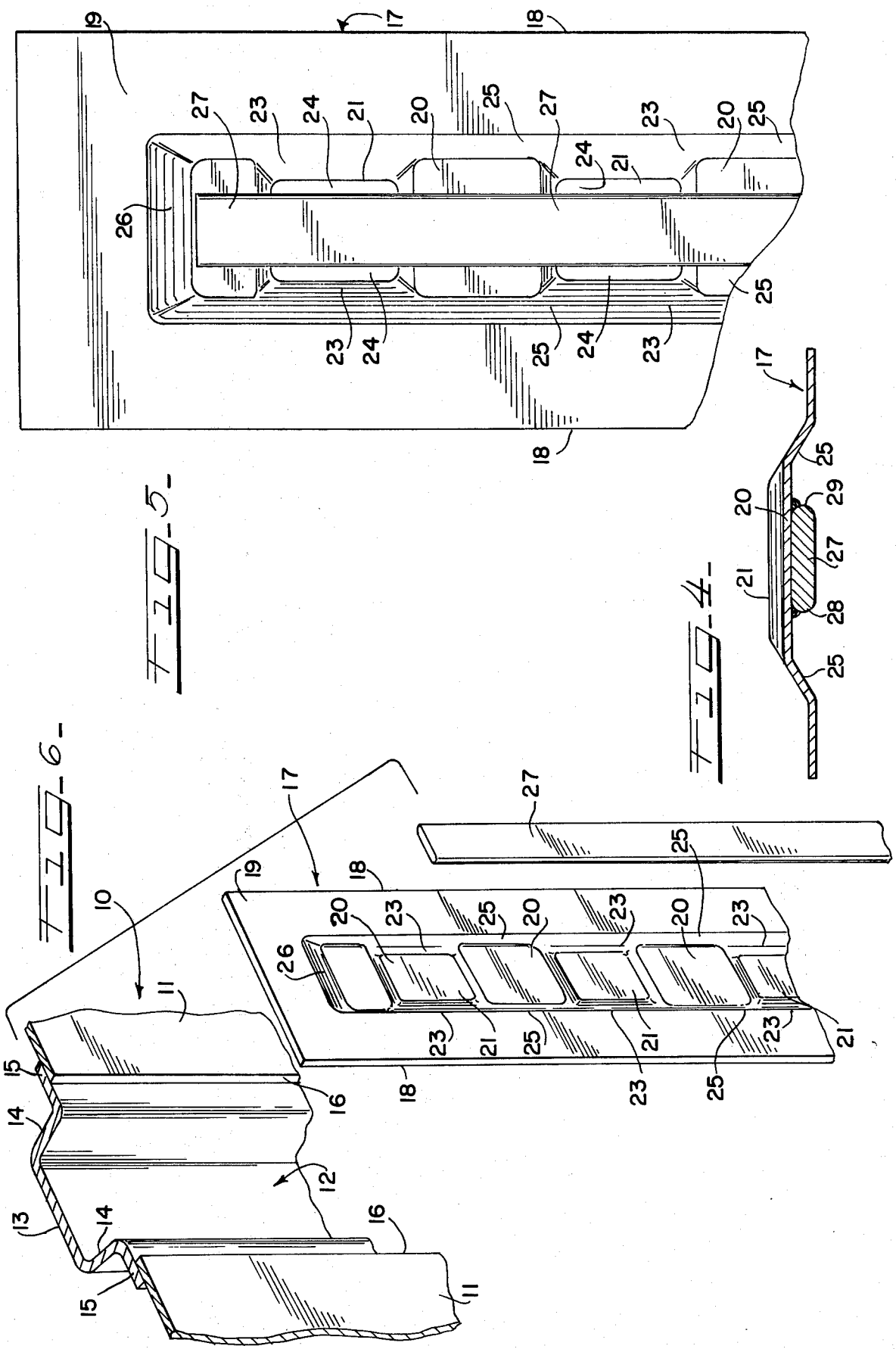

FREIGHT CAR LADING TIE DOWN ANCHOR

BACKGROUND OF THE INVENTION

1. Field of the Invention

This invention relates to railway freight vehicles and in particular to freight bracing devices including a lading tie anchoring arrangement supported in the side walls of the box car.

2. Description of the Prior Art

The prior art is replete with lading strap anchoring arrangements which are of complicated design and construction and in many instances do not provide for a flush inner side wall. A flush inner wall is desired so that there are no obstructions which will interfere and damage lading carried within the car. Prior art devices include arrangements which are difficult to install are not properly recessed and provide for a maximum number of parts which are costly to manufacture. The present arrangement has to do with an improved construction utilizing the outer hat-shaped side post for containing the anchoring design and structure. A pertinent design is shown in U.S. Pat. Nos. 3,769,917, Nov. 6, 1973 and in 3,842,756, Oct. 22, 1974. The present arrangement is an improvement over the afore-mentioned patented designs.

SUMMARY

It is the prime object of the invention to provide an improved lading anchor construction utilized in connection with an outside side post design box car. In the present invention an anchor plate may extend the vertical extent of the inner side wall of the box car and is connected to longitudinally extending flanges of the outer post. The plate provides a flush surface with the inner wall of the car and includes inwardly depressed attaching surfaces vertically spaced along the plate to which a vertical elongated steel bar is attached. Alternately spaced between the attaching surfaces are depressed pockets of greater depth then the depression of the attaching plates and these pockets include inner diagonally sloping walls forming wall openings on opposite sides of the bar through which the lading straps may be inserted and connected around the anchoring bar for securing the lading in position. The anchor plates may be easily manufactured by suitable stamping dies which form the depressed pockets and attaching surfaces and the assembly of three parts namely the attaching plate, side post and the bar can be easily achieved by welding thereby forming an effective lading anchor construction.

BRIEF DESCRIPTION OF THE DRAWINGS

FIG. 4 is a cross-sectional view taken substantially along the line 4—4 of FIG. 1;

FIG. 5 is a side elevational view of a portion of an anchor plate and anchor bar connected thereto; and FIG. 6 is a perspective view of a portion of a side wall and post construction of a box car showing in an exploded manner an anchor plate and bar ready for assembly with the combination.

DESCRIPTION OF THE PREFERRED EMBODIMENT

Figure 1:
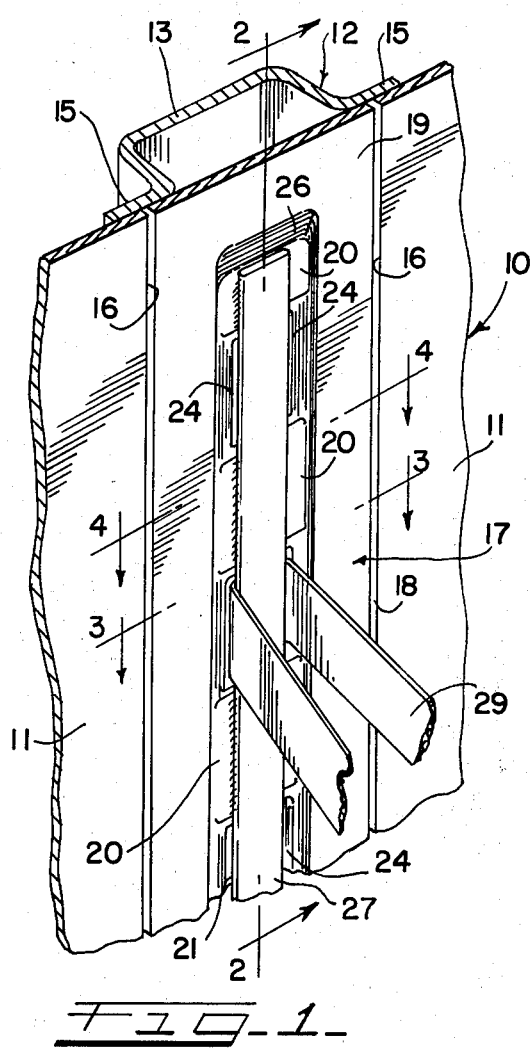
FIG. 1 is a perspective view of an inner side wall of a box car showing a lading anchor construction.

Referring now particularly to FIG. 1, an inner side wall of a box car is designated at 10 and includes wall sheathing portions 11. A vertical outside post 12 of channel or hat-shaped construction includes an outside web or wall 13 which is connected to inwardly extending vertical walls 14 having connecting flanges 15 extending in opposed longitudinal directions. The attaching flanges 15 are connected to vertical edge portions 16 of the wall sheathing 11 in partially overlapping relation leaving a portion of the flanges 15 available for securing an anchor plate 17 thereto. The anchor plate 17 includes vertical side edges 18 which are in substantially contiguous relation with respect to the vertical edge portions 16 and may be welded thereto. The connection of the sheathing and plate may of course be made by welding or other similar techniques.

The anchor plate 17 includes upper and lower flat portions 19 only the upper being shown since the lower construction is identical. Each of the plates also includes a plurality of vertically spaced attaching surfaces 20 which are outwardly depressed as indicated. In alternating relation between the attaching surfaces 20 there are provided a plurality of vertically spaced flat pocket portions 21 depressed a distance further outwardly than the attaching surfaces 20. The vertically spaced flat pocket portions 21 have connected thereto second diagonally extending portions 23 which are connected to the plate 17 and provide vertical openings or slots 24 through which lading straps may be inserted.

Figure 2:
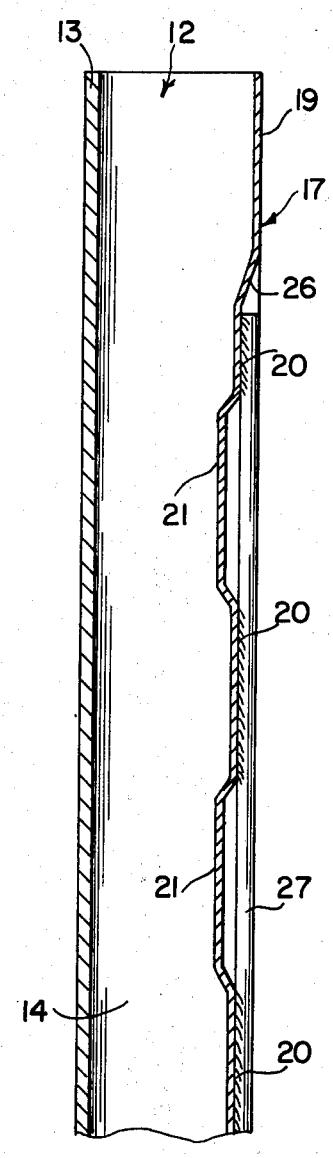
FIG. 2 is a cross-sectional view taken substantially along the line 2—2 of FIG. 1.
Figure 3:
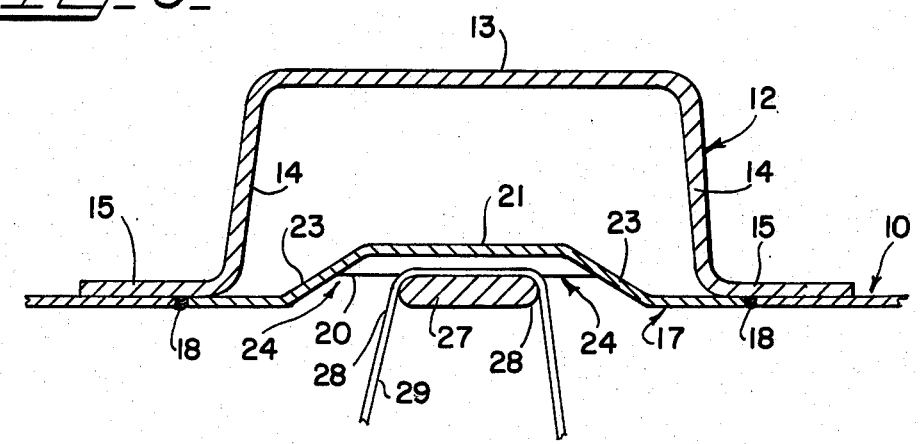
FIG. 3 is a cross-sectional view taken substantially along the line 3—3 of FIG. 1.

As best shown in FIG. 4, the vertical attaching surfaces 20 are provided with vertically extending third vertical plate portions 25 extending diagonally outwardly from the plate 17. As best shown in FIGS. 2 and 5, a fourth diagonal plate portion 26 extends vertically downwardly from the plate 17 and outwardly and is connected to the upper vertical attaching surface 20. The lower construction of the plate 17 is identical. A lading strap anchor bar 27 having rounded side edges 28 is rigidly welded to the attaching surfaces 20 and extends vertically over the pockets 21 within which a lading strap 29 may be secured about the bar 27. It is apparent that an effective and sturdy lading anchor arrangement has been disclosed which provides a completely flat and flush inner surface within the car. This is accomplished with the utilization of a minimum number of parts which can be readily assembled as indicated in FIG. 1 by merely welding the plate 17 to the exposed portions of the flanges 15. The anchor bar is attached to the plate 17 by means of welding and the assembly is then welded to the post to provide an efficient and simplified construction. The minimum number of parts required and the ease of manufacture provides for quick assembly, simple maintenance and great durability.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A railway box car having a body including vertical side walls,
   said side walls including vertical side posts generally hat-shaped in horizontal cross-section and including longitudinally extending inner brim flanges, wall sheathing having vertical edge portions overlapping longitudinally spaced outer portions of said brim flanges and being connected thereto, and an improved lading strap anchor unit, comprising:

a vertical anchor plate having an inner face and a vertically elongated outwardly depressed framing portion stamped therein and including vertical edge portions connected to said brim flanges in contiguous relation to the vertical edge portions of the sheathing and providing a flush inner vertical wall surface therewith, said framing portion having inner and outer levels spaced outwardly from said inner face and including a plurality of vertically spaced attaching surfaces at said first level, a vertical anchor bar connected to said attaching surfaces, and outwardly dished pocket sections in said framing portion between said attaching surfaces extending from said inner face to said second level, thereby providing vertical openings adapted to receive a lading strap about said anchor bar.

2. The invention according to claim 1, and
said framing portion being of an essentially frustopyramidal configuration.

3. The invention according to claim 1, and
said framing portion having a continuous rigidifying flange portion about its periphery projecting convergently diagonally outward from said inner face.

4. The invention according to claim 1, and
said anchor bar being relatively flat and having an inner surface substantially flush with said inner face.

* * * * *